United States Patent [19]

Obi et al.

[11] 4,177,323

[45] Dec. 4, 1979

[54] COATED METAL SHEET FOR USE IN PRODUCING A DRAWN AND IRONED CAN BODY

[75] Inventors: Tatsuro Obi, Tokyo; Teruo Koyama; Tadashi Tanaka, both of Yokahama; Atsushi Hasegawa, Osaka, all of Japan

[73] Assignees: Nippon Steel Corporation; Sakuranomiya Chemical Co., Ltd., both of Japan

[21] Appl. No.: 974,113

[22] Filed: Dec. 27, 1978

[30] Foreign Application Priority Data

Dec. 30, 1977 [JP] Japan .................. 52-160725

[51] Int. Cl.$^2$ ............................................. B32B 15/08
[52] U.S. Cl. .................. 428/622; 428/626; 428/416; 428/418; 428/460; 428/463; 113/120 A
[58] Field of Search ............... 428/416, 418, 460, 463, 428/648, 653, 679, 680, 667, 622, 626, 623; 113/120 A

[56] References Cited

U.S. PATENT DOCUMENTS

| | | | |
|---|---|---|---|
| 2,964,491 | 12/1960 | Rylander | 428/460 |
| 3,206,848 | 9/1965 | Rentmiester | 113/120 A |
| 3,663,354 | 5/1972 | Ueno et al. | 260/831 |
| 3,832,962 | 9/1974 | Rolles | 113/120 A |
| 3,993,841 | 11/1976 | Matsubara et al. | 428/416 |
| 4,035,436 | 7/1977 | Matsubara et al. | 428/416 |
| 4,112,160 | 9/1978 | Kako et al. | 428/463 |

Primary Examiner—L. Dewayne Rutledge
Assistant Examiner—Michael L. Lewis
Attorney, Agent, or Firm—Wenderoth, Lind & Ponack

[57] ABSTRACT

A coated metal sheet adapted for use in producing a drawn and ironed can body. This sheet is coated with a coating composition film completely cured on it, the coating composition consisting of epoxy-phenolic resin prepared by condensing thermosetting type phenol resin with bisphenol epoxy resin-A and olefin type hydrocarbon added thereto in an amount of 0.5 to 2.0 weight percent. This coated metal sheet has excellent drawing and ironing formability and the coating film thereof shows excellent adhesion and coating integrity.

9 Claims, 4 Drawing Figures

FIG. 2A FIG. 2B FIG. 2C
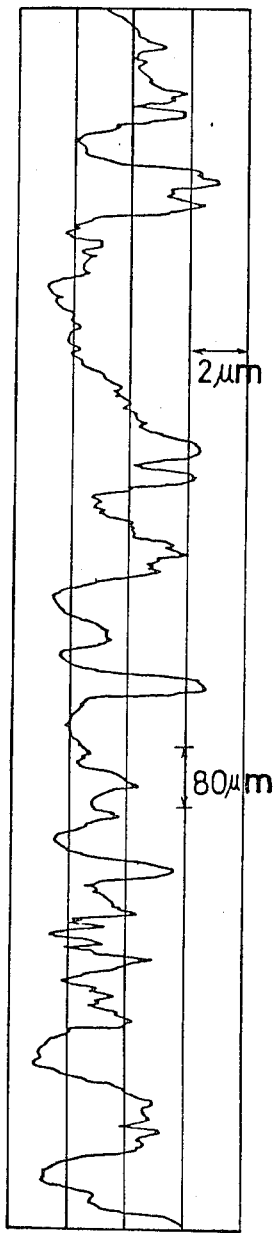
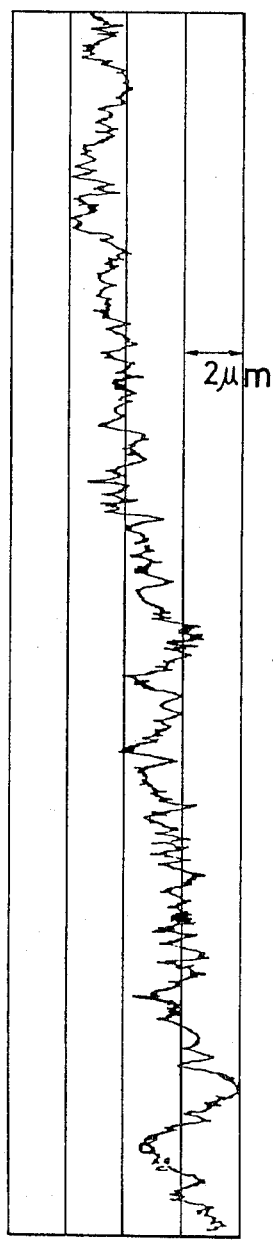
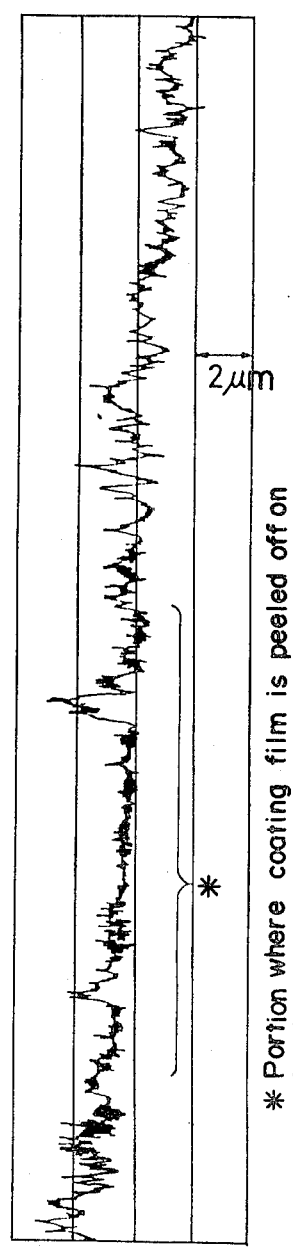
\* Portion where coating film is peeled off on ironing.

COATED METAL SHEET FOR USE IN PRODUCING A DRAWN AND IRONED CAN BODY

DETAILED DESCRIPTION OF THE INVENTION:

Figure 1:
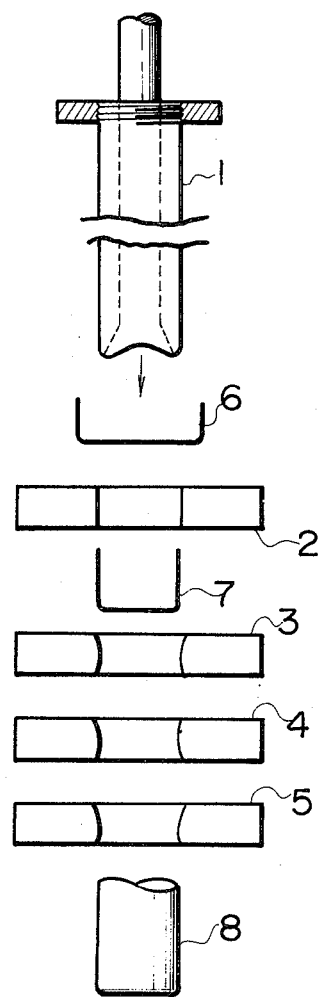

This invention relates to a coated metal sheet adapted for use in manufacturing a drawn and ironed can body (hereinafter called a D & I can body) which is produced by completely curing a coating material of epoxy-phenolic type on the base metal sheet.

The term "completely cure" herein means the state of coating film wherein the insoluble part of the coating film cured is in the range of 65% to 90% according to the methylethylketone Solvent Extraction Method (2 hours 20° C., dip). In addition, the metal sheet employed in this invention is a cold-rolled steel sheet, a cold-rolled steel sheet subjected to a slight surface treatment, a tin-plate, an aluminum-plated steel sheet, a chromium-plated steel sheet or an aluminum sheet.

The coated metal sheet of this invention has excellent D & I formabilities, especially continuous formability, coating integrity of the coating film after formed and corrosion-resistance. Such excellent D & I formabilities greatly depend upon the resin composition of the coating material used, that is the component of epoxy-phenolic resin containing acetal type resin and the component of olefin type hydrocarbon shown by a chemical formula $CnH_{2n}$ (n=31-38) containing $CnH_{2n}COOH$ (molecular weight distribution: 1,000–5,000).

There have already been published several investigations on the coated steel sheet used for manufacturing a D & I can body. One of them is "MODERN METALS" (pages 60 to 64) published by Bethlehem Steel Corporation in 1977. Another is Japanese Laid-Open Pat. Publication No. 63787/71 (U.S. Pat. application Ser. No. 514024).

The former is directed to the use of a coating material consisting of epoxy phenol and ester of fatty acid is applied to a cold-rolled steel sheet and it is partially cured on the steel sheet whereby the D & I forming will be made possible. The latter is also intended for the case wherein a resin of the partial cure type is employed as a coating materials. In addition, Japanese Pat. application No. 5849/76 discloses that as the result of studying epoxy resin compositions a coating material containing a large amount of phenol component is completely cured on a steel sheet so that the D & I process of the steel sheet has successfully been conducted. Japanese Laid-Open Patent Publication No. 37746/78 discloses the that an ordinary coating material for a can containing ethylene-vinyl acetate copolymer is completely cured on a steel sheet, whereby the D & I process of the steel sheet has successfully been carried out.

This invention, however, is different in the coating resin composition employed from these prior art processes.

Furthermore, Japanese Laid-Open Patent Publication No. 81469/78 describes a coated steel sheet which can be used as a material for manufacturing a D & I can body. However, the Publication is also different in technical content from this invention. The coated metal sheet according to this invention reveals very excellent properties when it is worked by the D & I process.

Nowadays, a large number of D & I can bodies have been manufactured by the use of a tin-plate sheet or an aluminum as a material owing to a rapid technical progress, which has a great influence on can-manufacturers. It has been expected that the D & I can body will finally be manufactured by using a cold-rolled steel sheet as a material in the future, which can be recognized as an establishment of a considerably useful manufacturing means from the viewpoints of saving energy and material and decreasing cost of manufacturing.

This invention is based upon the above-mentioned requirements.

According to this invention there is provided a coated metal sheet (1) adapted for use as a drawn and ironed can body which comprises a metal sheet and a coating composition film completely cured on its body surfaces or one surface to be made the outer surface of a can body to be formed in the dryed film thickness of 2 to 10 μm, said coating composition comprising epoxy-phenolic resin containing an acetal type resin and an olefin type hydrocarbon shown by chemical formula $CnH_{2n}$ (n=31 to 38) containing $CnH_{2n}COOH$ having molecular weight distribution of 1,000 to 5,000 which is added to the epoxy-phenolic resin in an amount of 0.5 to 2.0% by weight, said epoxy-phenolic resin being prepared by condensing thermosetting type phenol resin with bisphenol epoxy resin-A having mean molecular weight of 450 to 3700 at the weight ratio of 25:75 to 10:90, said thermosetting-type phenol resin being prepared by condensing the mixture of meta-cresol and para-cresol at the weight ratio of 30:70 to 60:40 with formaldehyde in the presence of an alkali catalyst.

According to this invention there is also provided a coated metal sheet (2) according to the metal sheet (1) in which the olefin type hydrocarbon is added to the epoxy-phenolic resin at a temperature between 85° C. and 110° C.

According to this invention there is also provided a coated metal sheet (3) according to the metal sheet (1) in which the epoxy-phenolic resin contains the acetal type resin in an amount of 1 to 3% by weight.

According to this invention there is also provided a coated metal sheet (4) according to the metal sheet (1) in which the olefin type hydrocarbon contains the $CnH_{2n}COOH$ in an amount of 1 to 10% by weight.

According to this invention there is also provided a coated metal sheet (5) according to the metal sheet (1) in which the alkali catalyst is selected from the group consisting of ammonia catalyst and sodium hydroxide.

According to this invention there is also provided a coated metal sheet (6) according to the metal sheet (1) in which the metal sheet is selected from the group consisting of a cold rolled steel sheet, a chromium-plated steel sheet, a tin-plate, a nickel-plated steel sheet, an aluminum-plated steel sheet, a cold-rolled steel sheet subjected to slight surface treatment and an aluminum sheet.

According to this invention there is also provided a coated metal sheet (7) according to the metal sheet (1) in which the insoluble part in the coating composition film completely cured is in the range of 65% to 90%.

According to this invention there is also provided a coated metal sheet (8) according to the metal sheet (6) in which the insoluble part is in the range of 70% to 80%.

According to this invention there is also provided a coated metal sheet (9) according to the metal sheet (1) in which the acetal resin is polyvinyl butyral resin.

This invention is described in detail below.

First, the conditions of the D & I process are described with reference to the accompanying drawings.

FIG. 1 is an illustration showing a D & I process.

FIGS. 2 A, B and C are profiles showing the surface roughness of side walls of can bodies formed by the D & I process.

An aluminum-killed steel sheet, a tin-plate sheet, an aluminum-plated steel sheet, a chromium-plated steel sheet and an aluminum sheet are coated with the coating material of this invention on both side surfaces or one side surface of each thereof which should be made the outside wall of a can body in the dried film thickness of 2 to 10 μm and they are completely cured so that the coated sheets used for manufacturing a D & I can body are obtained. The D & I process as performed on them is effected as shown in FIG. 1.

Prior to the drawing and ironing steps, the sheets are drawn to cups having diameter of 86.90 mmφ and height of 35 mm by a Crankpress and thereafter the drawing and ironing steps are carried out by the use of 5 ton-oil pressure press. The D & I process is described in detail below.

A cup 6 formed in the above manner is formed to a cup 7 having the diameter of 65.40 mmφ by the use of a punch 1 and a secondary drawing die 2. Next, the side wall of the cup 7 is strongly stretched by ironing dies 3, 4, and 5 so that a can body 8 is formed. The removal of the can body from the punch, i.e. stripping, is carried out by hooking the circumference of the upper end of the can body with a jaw or so when the punch is retreated after the final ironing step is completed.

The measurement of the loads in the course of the steps is made by load cells installed on the drawing and ironing apparatus whereby the secondary drawing load, the first, second and third ironing loads and the stripping load can be detected.

The conditions of the D & I process are as follows:

| | |
|---|---|
| Forming velocity: | 20 m/minute |
| Diameter of secondary drawing die: | 66.10 mmφ |
| Diameter of first ironing die: | 65.90 mmφ |
| Diameter of second ironing die: | 65.70 mmφ |
| Diameter of third ironing die: | 65.60 mmφ |
| Diameter of punch: | 65.40 mmφ |
| Distance of one stroke: | 350 mm |

The can body obtained under the above conditions has inner diameter of 2(11/16) inches (65.4 mm) and height of 4(13/16) inches (122 mm), that is it meets 211×413 Can Size according to U.S. Standard of can size. In this case, the formability of a metal sheet at the time of the drawing and ironing steps can be judged by measuring the first, second and third ironing forces and the stripping force required.

In the development of a coated metal sheet used for manufacturing a D & I can body, the most important point is that the coating film of the metal sheet not be peeled off in the course of the drawing step and/or ironing steps, especially ironing steps. If the coating film peeled off is stuck to the ironing dies or the ironing punch, the phenomena of "galling" is partially caused. In case that the accumulation or build-up of the coating film proceeds, and it becomes impossible to conduct the ironing steps themselves, worst comes to worst, the can body is feared off. In addition, even if the can body with its coating film partially peeled off is obtained by the D & I process, the can body is an inferior goods. In such a can body, the base metal sheet is crushed by the direct contact with the ironing dies so that the original shape of the base metal sheet is partially deformed as shown in FIGS. 2 A, B and C. That is, the can body is adversely affected with regard to the uniformity of its outer appearance and the paintability of its outer surface, which are commercially important to a can body. Furthermore, even if the ironing steps can be conducted, a large amount of power is required to draw the punch out of the can body formed, which causes the decrease in efficiency of the continuous form in the D & I process and the deterioration in shape of the can body formed. Thus, in case that the deficiency or build-up of the coating film takes place at the time of ironing steps, it becomes almost impossible to work a coated metal sheet by the D & I process.

Next, there is known another method for forming a can body wherein there is a drawing and redrawing process (hereinafter called Dr. D process) in which a can body is formed by only the drawing and redrawing steps which are carried out prior to the ironing steps in the D & I process. One example of the DrD process is described below whereby the differences between the D & I process and the DrD process will be clarified.

In the DrD process a Crankpress is generally employed for the drawing step. In this example a cold-rolled steel sheet having thickness of 0.23 mm is used. In the first drawing step the steel sheet having blank diameter of 185 mmφ is drawn to a cup in which the diameter of the cup is 90 mm, the height of cup/diameter of cup (H/D) is 0.6 and drawing rate is 2.06. In the second drawing step the cup thus formed is redrawn to a can body. The DrD can body thus obtained has diameter of 75 mm, H/D of 1.0 and drawing rate of 2.47.

In the DrD process, a clearance corresponding to the thickness of the material to be worked is provided between the punch and the dies, and the diameter of the can body is decreased and the height thereof is increased while the pressure for suppressing the occurrence of wrinkles is being applied to the can body. On the other hand, in the D & I process, the drawing and redrawing steps are conducted in the same manner as in the DrD process but thereafter, in the three ironing steps, the material to be worked is strongly stretched by the ironing forces at the time when the material is passed through the ironing dies. Since the clearance between the punch and the dies is set to less than the thickness of the material to be worked whereby the thickness of the material is decreased and the height thereof is increased.

As set forth above, the D & I process is much severer in working conditions than the DrD process and the former is much higher than the latter regarding the working forces applied to the lubricating coating film on the surface of the metal sheet to be worked. That is, in the DrD process, the coating properties applied to the metal sheet previous to the drawing and redrawing steps is kept stable since the metal sheet is not subjected to a strongly stretching treatment under the extremely high pressure and, even after the can body is formed, it is unnecessary to overcoat the coating film previously formed and, therefore, the can body as it is has enough properties to be used as a can body for food stuffs, as to the adhesion of the coating film and the corrosion-resistance property thereof.

On the other hand, in the can body produced by the D & I process the adhesion and corrosion-resistance property of the coating film formed on the metal sheet prior to the process tends to become deteriorated except for the bottom part of the can body since the metal sheet is subjected to a strongly stretching treatment under the extremely high pressure. Accordingly, the inside wall of the can body produced by the D & I process is generally subjected to the overcoating treatment once or twice in order to enchance the corrosion-resistance of the can body. In the overcoating treatment, a vinyl-type resin or epoxyurea resin is applied to the can body in an amount of 80 to 90 mg/dm$^2$. In the D & I can body, thus, the adhesion and corrosion-resistance of the preliminary coating film slightly varies in accordance with the kind of metal sheet to be used and the preliminary treatment to be conducted but it is difficult to keep the sufficient adhesion of the coating film and corrosion-resistance of the can body by only the preliminary coating film after the can body is formed. Therefore, in the D & I process, the can body formed is in general subjected to the overcoating treatment. In addition, the coating materials used in the D & I process as it is hardly employed as those in the DrD process.

On the other hand, the coating materials which are used in the D & I process can ordinarily be employed as those in the DrD process.

This invention is further described in detail in the order of coating composition, lubricant, condition of curing and metal sheet to be used in this invention.

The coating material of this invention consists mainly of epoxy-phenolic resin. The resin to be used in this invention is preferably epoxy-phenolic resin having mean molecular weight of 450 to 3,700, epoxy equivalent of 230 to 4,000 and hydroxyl group equivalent of 115 to 225, more preferably bis-phenolic —A— epoxy resin having a mean molecular weight of 900 to 3,000, epoxy equivalent of 450 to 2,000 and hydroxyl group equivalent of 115 to 200.

On the hand, the methylol phenol resin used as a modifying agent is phenol resin of thermosetting type which can be obtained by condensing the mixture of meta-cresol and para-cresol with formaldehyde in the presence of an alkali catalyst such as an ammonia catalyst or caustic soda catalyst.

The composition of the epoxy-phenolic resin is described below.

The resin coating composition consists of a thermosetting type phenol resin and bisphenol epoxy resin-A, the thermosetting type phenol resin being obtained by condensing the mixture of meta-cresol and para-cresol at the weight ratio of 30:70 to 60:40 with formaldehyde and allowing the condensed material to contain such an acetal type resin as polyvinyl-butyral resin in an amount of 1 to 3% by weight. The addition of the acetal type resin is intended for the decrease in the drawing and ironing loads and the improvement in coating integrity. Additionally, the acetal type resin functions to supplement the uniform mixture of the coating resin and the olefin type hydrocarbon components described below.

The resin coating composition is uniformly admixed with olefin type hydrocarbon in an amount of 0.5–2.0%, preferably 1.5% or so, by weight. The resin composition thus prepared is investigated regarding the composition ratio of phenol component to epoxy component.

The Table 1 shows the relation of composition ratio of the epoxy component to the phenol component.

The ratio of the epoxy component of the phenol component is examined and the proper range thereof is determined. In this case, the D & I formability of the coated metal sheet used for manufacturing a D & I can is judged on the basis of the ironing loads and the stripping load in the ironing steps. That is, the coated metal sheet can smoothly be worked when the first, second and third ironing loads and the stripping load respectively meet 2.5 ton/can or less, 2.0 ton/can or less, 2.0 ton/can or less and 0.25 ton/can or less. As a result, excellent ironing loads and stripping load can be obtained when the weight ratio of phenol component to epoxy component is between 25:75 and 10:90. In case that the phenol component is 25% or more by weight, the formability in the second ironing step is not only decreased but also the tendency of the resin to yellow is increased, which is not preferable. Furthermore, if the phenol component is 10% or less by weight, the corrosion-resistance of the can body formed by the D & I process becomes poor, which is not preferable.

Table 1

Coated steel sheets for D & I can body
Relation of composition ratio between phenol component and epoxy component

| Coating number | Epoxy-phenolic resin coating | | Thickness of coating film (μm) | | D & I formability | | | | Stripping load | | Total judgement |
|---|---|---|---|---|---|---|---|---|---|---|---|
| | 1 Epoxy (weight part) | Phenol (weight part) | Outside of can body | Inside of can body | Ironing loads ton/can | | | Judgement | ton/can | Judgement | |
| | | | | | 1st | 2nd | 3rd | | | | |
| 1-1 | 5 | *2 95 | 5 | 6 | 2.7 | 2.3 | 2.3 | X | 0.26 | X | X |
| 1-2 | 55 | 45 | 5 | 6 | 2.4 | 2.4 | 2.4 | X | 0.26 | X | X |
| 1-3 | 65 | 35 | 5 | 6 | 2.4 | 2.4 | 2.4 | X | 0.25 | X | X |
| 1-4 | 75 | 25 | 5 | 6 | 2.2 | 1.8 | 1.7 | O | 0.23 | O | O |
| 1-5 | 80 | 20 | 5 | 6 | 2.2 | 1.8 | 1.7 | O | 0.22 | O | O |
| 1-6 | 85 | 15 | 5 | 6 | 2.3 | 1.9 | 1.8 | O | 0.23 | O | O |
| 1-7 | 90 | 10 | 5 | 6 | 2.2 | 1.8 | 1.8 | O | 0.23 | O | O |
| 1-8 | 95 | 5 | 5 | 6 | 2.7 | 2.3 | 2.4 | X | 0.25 | X | X |
| 1-9 | 5 | *3 95 | 5 | 6 | 2.6 | 2.4 | 2.3 | X | 0.26 | X | X |
| 1-10 | 55 | 45 | 5 | 6 | 2.5 | 2.4 | 2.3 | X | 0.26 | X | X |
| 1-11 | 65 | 35 | 5 | 6 | 2.7 | 2.3 | 2.4 | X | 0.26 | X | X |
| 1-12 | 75 | 25 | 5 | 6 | 2.2 | 1.8 | 1.8 | O | 0.22 | O | O |
| 1-13 | 80 | 20 | 5 | 6 | 2.2 | 1.9 | 1.8 | O | 0.23 | O | O |
| 1-14 | 90 | 10 | 5 | 6 | 2.3 | 1.9 | 1.7 | O | 0.23 | O | O |
| 1-15 | 95 | 5 | 5 | 6 | 2.6 | 2.4 | 2.4 | X | 0.26 | X | X |
| 1-16 | 75 | *4 25 (25 75) | 5 | 6 | 2.6 | 2.4 | 2.3 | X | 0.25 | X | X |
| 1-17 | 75 | 25 (30 70) | 5 | 6 | 2.3 | 1.8 | 1.7 | O | 0.23 | O | O |
| 1-18 | 75 | 25 (40 60) | 5 | 6 | 2.2 | 1.8 | 1.8 | O | 0.22 | O | O |
| 1-19 | 75 | 25 (50 50) | 5 | 6 | 2.2 | 1.8 | 1.9 | O | 0.22 | O | O |
| 1-20 | 75 | 25 (60 40) | 5 | 6 | 2.2 | 1.7 | 1.9 | O | 0.22 | O | O |
| 1-21 | 75 | 25 (70 30) | 5 | 6 | 2.6 | 2.4 | 2.3 | X | 0.26 | X | X |

Table 1-continued

Coated steel sheets for D & I can body
Relation of composition ratio between phenol component and epoxy component

| Coating number | Epoxy-phenolic resin coating | | Thickness of coating film ($\mu m$) | | D & I formability | | | | Stripping load | | Total judgement |
|---|---|---|---|---|---|---|---|---|---|---|---|
| | 1 Epoxy (weight part) | Phenol (weight part) | Outside of can body | Inside of can body | Ironing loads ton/can | | | Judgement | ton/can | Judgement | |
| | | | | | 1st | 2nd | 3rd | | | | |
| 1-22 | 85 | 15 (25 75) | 5 | 6 | 2.7 | 2.4 | 2.3 | X | 0.25 | X | X |
| 1-23 | 85 | 15 (30 70) | 5 | 6 | 2.2 | 1.8 | 1.8 | O | 0.22 | O | O |
| 1-24 | 85 | 15 (40 60) | 5 | 6 | 2.2 | 1.8 | 1.7 | O | 0.22 | O | O |
| 1-25 | 85 | 15 (50 50) | 5 | 6 | 2.3 | 1.8 | 1.8 | O | 0.22 | O | O |
| 1-26 | 85 | 15 (60 40) | 5 | 6 | 2.3 | 1.8 | 1.8 | O | 0.22 | O | O |
| 1-27 | 85 | 15 (70 30) | 5 | 6 | 2.6 | 2.4 | 2.3 | X | 0.28 | X | X |
| Control (partially cured coating) | — | — | 5 | 6 | 2.6 | 2.4 | 2.8 | X | 0.28 | X | X |

Remarks:
*1 Epoxy: EPICOTE #1007 (made by Shell Oil Co., Ltd.)
*2 and below: Phenol (the ratio by weight of meta-cresol to para-cresol is 35:65)
*3 and below: Phenol (the ratio by weight of meta-cresol to para-cresol is 60:40)
*4 and below: Phenol (the ratio by weight of meta-cresol and para-cresol is changed as shown by parenthesized passages.)
*5 Coated steel sheet produced by completely curing a coating resin component containing olefin type hydrocarbon $CnH_{2n}$ (n = 31 to 38) in an amount of 1.5% by weight, the hydrocarbon containing $CnH_{2n}COOH$ (molecular weigh distribution: 1,000 to 5,000)
*6 Coating resin composition containing polyvinyl-butyral resin in an amount of 1% by weight The olefin type hydrocarbon used in this invention is described below.

It is preferable that the carbon number of the olefin type hydrocarbon shown by the chemical formula $CnH_{2n}$ to be added to the coating resin range from 31 to 38 since the coating resin containing the $CnH_{2n}$ shows excellent D & I formability of the metal sheet and the can body with said coating resin formed has good coating integrity and corrosion property. In addition, the $CnH_{2n}COOH$ to be added to the $CnH_{2n}$ should preferably have molecular weight distribution of 1,000 to 5,000 since it acts to further improve the D & I formability of the metal sheet. Table 2 shows the influence of carbon number of the olefin type hydrocarbon and the influence of the amount of addition of the olefin type hydrocarbon ($CnH_{2n}$) containing $CnH_{2n}COOH$ (molecular weight distribution: 1,000 to 5,000). As is noted from Table 2, it is preferable that the carbon number (n) of the $CnH_{2n}$ be 31 to 38 and the amount of addition of the olefin type hydrocarbon is 0.5 to 2.0% by weight. When the amount of addition of the olefin type hydrocarbon is 0.5 to 3.0% by weight, the coating resin film shows excellent D & I formability but when the amount of addition is 0.4% or less by weight, the formability is reduced and becomes poor and the continuous D & I formability is deteriorated. Furthermore, if the amount of addition is 2.1% or more by weight, the coating film formed on a metal sheet is deteriorated in uniformity. Therefore, when the amount of addition ranges from 0.5% to 2.0% by weight, the coating film shows excellent D & I formability and good uniformity of the coating composition. In this case, the coated metal sheet forming for a D & I can body in which the coating resin of this invention is applied to both the surfaces of a metal sheet in the thickness of about 5 $\mu m$/side and is cured completely shows excellent ironing formability and stripping workability in the ironing steps.

On the other hand, when the carbon number (n) of the olefin type hydrocarbon is 30 or less, the lubricating property of the coating film is deteriorated whereby the unevenness of the surface coating film is caused after the D & I process is conducted. In addition, in case where the carbon number is 39 or more, the D & I process can be carried out but the appearance of the coating film is slightly deteriorated and the corrosion-resistance of a can body formed is sometimes deteriorated.

Table 2

Influence of the carbon number of the olefin type hydrocarbon to be added to coating resin *6

| Coating number | Carbon number of olefin type hydrocarbon ($CnH_{2n}$) containing $CnH_{2n}COOH$ (molecular weight distribution: 1,000 to 5,000) | Epoxy-phenolic Resin coating film (thickness: 5$\mu$m) | | The amount of addition of olefin type hydrocarbon ($CnH_{2n}$)containing ($CnH_{2n}COOH$ (molecular weight distribution 1,000 to 5,000) in an amount of 5% by weight | | | D & I formability *4 | | | | Stripping load (ton/can) | | Total judgement |
|---|---|---|---|---|---|---|---|---|---|---|---|---|---|
| | | *1 Epoxy (weight part) | *2 Phenol (weight part) | Inside of can body (%) | Outside of can body (%) | *3 Appearance of coating film | Ironing loads (ton/can) | | | Judgement | | Judgement | |
| | | | | | | | 1st | 2nd | 3rd | | | | |
| 2-1 | 24–30 | 80 | 20 | 0 | 0 | O | 2.7 | 2.3 | 2.3 | X | 0.26 | X | X |
| 2-2 | " | 80 | 20 | 0.5 | 0.5 | O | 2.3 | 2.0 | 2.3 | Δ | 0.25 | Δ | Δ |
| 2-3 | " | 80 | 20 | 1.0 | 1.0 | O | 2.3 | 2.0 | 2.3 | Δ | 0.25 | Δ | Δ |
| 2-4 | " | 80 | 20 | 1.5 | 1.5 | O | 2.3 | 2.0 | 2.3 | Δ | 0.26 | Δ | Δ |
| 2-5 | " | 80 | 20 | 1.0 | 2.0 | O | 2.2 | 1.8 | 2.4 | Δ | 0.26 | Δ | Δ |
| 2-6 | " | 80 | 20 | 1.5 | 2.5 | Δ | 2.3 | 1.7 | 1.6 | Δ | 0.27 | Δ | Δ |
| 2-7 | 31–38 | 80 | 20 | 0 | 0 | O | 2.8 | 2.3 | 2.3 | X | 0.26 | X | X |
| 2-8 | " | 80 | 20 | 0.5 | 0.5 | O | 2.7 | 1.8 | 1.7 | O | 0.24 | O | O |
| 2-9 | " | 80 | 20 | 1.0 | 1.0 | O | 2.4 | 1.7 | 1.7 | O | 0.23 | O | O |
| 2-10 | " | 80 | 20 | 1.5 | 1.5 | O | 2.3 | 1.7 | 1.6 | O | 0.22 | O | O |
| 2-11 | " | 80 | 20 | 1.0 | 2.0 | O | 2.3 | 1.7 | 1.8 | O | 0.22 | O | O |

Table 2-continued

Influence of the carbon number of the olefin type hydrocarbon to be added to coating resin *6

| Coating number | Carbon number of olefin type hydrocarbon ($C_nH_{2n}$) containing $C_nH_{2n}COOH$ (molecular weight distribution: 1,000 to 5,000) | Epoxy-phenolic Resin coating film (thickness: 5μm) *1 Epoxy (weight part) | *2 Phenol (weight part) | The amount of addition of olefin type hydrocarbon ($C_nH_{2n}$) containing ($C_nH_{2n}COOH$ (molecular weight distribution 1,000 to 5,000) in an amount of 5% by weight Inside of can body (%) | Outside of can body (%) | *3 Appearance of coating film | D & I formability *4 Ironing loads (ton/can) 1st | 2nd | 3rd | Judgement | Stripping load (ton/can) | Judgement | Total judgement |
|---|---|---|---|---|---|---|---|---|---|---|---|---|---|
| 2-12 | " | 80 | 20 | 1.5 | 2.5 | Δ | 2.3 | 1.7 | 1.7 | Δ | 0.21 | O | Δ |
| 2-13 | 39-44 | 85 | 15 | 0 | 0 | O | 2.7 | 2.4 | 2.3 | X | 0.27 | X | X |
| 2-14 | " | 85 | 15 | 0.5 | 0.5 | Δ | 2.7 | 1.9 | 1.7 | O | 0.23 | O | Δ |
| 2-15 | " | 85 | 15 | 1.0 | 1.0 | Δ | 2.3 | 1.8 | 1.6 | O | 0.22 | O | Δ |
| 2-16 | " | 85 | 15 | 1.5 | 1.5 | Δ | 2.3 | 1.7 | 1.6 | O | 0.22 | O | Δ |
| 2-17 | " | 85 | 15 | 1.0 | 2.0 | Δ | 2.2 | 1.6 | 1.7 | O | 0.22 | O | Δ |
| 2-18 | " | 85 | 15 | 1.5 | 2.5 | x | 2.2 | 1.9 | 1.8 | O | 0.21 | O | Δ |

Remarks:
*1 Epoxy: EPICOTE #1007 (Trade Mark) Shell Oil Co., Ltd.
*2 Phenol: Ratio of meta-cresol to para-cresol is 60:40.
*3 Appearance of coating is very important to judge of a coating metal sheet.
*4 In D & I process, the lower the ironing loads are, the more smoothly a coated metal sheet is worked. When the loads of the first, second and third ironing steps are 2.5, 2.0 and 2.0 ton/can, respectively, the steps are effected smoothly.
*5 When the stripping load of the D & I process is 0.25 ton/can or less, a coated metal sheet can be worked smoothly.
*6 The coating resin component contains polyvinyl butyral in an amount of 1% by weight.

The addition of such an acetal type resin as polyvinyl butyral to the coating resin is described below.

One of the features of this invention is that the acetal type resin is added to the coating resin in an amount of 1 to 3% by weight. That is, the following effects can be obtained by the addition of the acetal type resin.
(1) The loads required in the drawing and ironing steps can be reduced.
(2) The coating integrity of the side wall of the can body produced by the D & I process can be enhanced.
(3) The olefin type hydrocarbon which is a lubricant can be dispersed uniformly into the coating resin.

Therefore, if the acetal type resin is not added to the coating resin, the loads required to form a can body is increased in the D & I process, especially the ironing steps and the coating integrity is lowered whereby it is sometimes made impossible to achieve the object of this invention. In addition, the polyvinyl butryal resin contained in the coating resin acts to disperse the olefin type hydrocarbon uniformly in the coating resin, as mentioned above. The amount of addition of the polyvinyl butyral required for the uniform dispersion is 1 to 3% by weight. If the coating resin does not contain the polyvinyl butyral, the olefin type hydrocarbon can be dispersed uniformly in the coating resin bath having a high temperature but when the bath temperature is reduced to an ordinary temperature, i.e. 20° C. to 30° C., the uniform dispersion of the olefin type hydrocarbon is deteriorated, which causes the decrease in the paintability of the coating resin. Table 3 shows the influence of the polyvinyl butyral resin to be added to the coating resin.

Table 3

Influence of polyvinyl butyral resin to be added to the coating resin

| Coating number | The amount of addition of polyvinyl butyral(%)*1 | Coating (thickness: 5μm) Epoxy-phenolic resin *2 Epoxy (weight part) | Phenol (weight part) | D & I formability *4 Ironing loads (ton/can) 1st | 2nd | 3rd | Judgement | Stripping load (ton/can)*5 Judgement | Total judgement | Condition of coating film after D & I steps *6 | Condition of olefin type hydrocarbon added to the coating resin *7 (Temperature of addition: 95° C.) |
|---|---|---|---|---|---|---|---|---|---|---|---|
| 3-1 | 0 | 85 | 15*3 (35/65) | 2.7 | 2.3 | 2.3 | x | 0.25 O | x | Δ | Δ |
| 3-2 | 1 | 85 | 15 (35/65) | 2.3 | 1.8 | 1.7 | O | 0.23 O | O | O | O |
| 3-3 | 2 | 85 | 15 (35/65) | 2.3 | 1.7 | 1.7 | O | 0.23 O | O | O | O |
| 3-4 | 3 | 85 | 15 (35/65) | 2.3 | 1.7 | 1.7 | O | 0.22 O | O | O | O |
| 3-5 | 0 | 85 | 15 (60/40) | 2.6 | 2.2 | 2.1 | x | 0.25 O | x | Δ | Δ |
| 3-6 | 1 | 85 | 15 (60/40) | 2.3 | 1.9 | 1.8 | O | 0.23 O | O | O | O |
| 3-7 | 2 | 85 | 15 (60/40) | 2.3 | 1.8 | 1.7 | O | 0.22 O | O | O | O |
| 3-8 | 3 | 85 | 15 (60/40) | 2.3 | 1.8 | 1.8 | O | 0.23 O | O | O | O |
| 3-9 | 0 | 80 | 20 (60/40) | 2.5 | 2.2 | 2.1 | Δ | 0.25 O | Δ | Δ | Δ |
| 3-10 | 1 | 80 | 20 (60/40) | 2.3 | 1.9 | 1.8 | O | 0.23 O | O | O | O |
| 3-11 | 2 | 80 | 20 (60/40) | 2.3 | 1.8 | 1.7 | O | 0.23 O | O | O | O |

Table 3-continued

| | | Coating (thickness: 5μm) Epoxy-phenolic resin | | | D & I formability *4 Ironing loads (ton/can) | | | | Stripping load (ton/can)*5 | | Condition of coating film after D & I steps *6 | Condition of olefin type hydrocarbon added to the coating resin *7 (Temperature of addition: 95° C.) |
|---|---|---|---|---|---|---|---|---|---|---|---|---|
| Coating number | The amount of addition of polyvinyl butyral(%)*1 | *2 Epoxy (weight part) | Phenol (weight part) | | 1st | 2nd | 3rd | Judgement | Judgement | Total judgement | | |
| 3-12 | 3 | 80 | 20 | (60/40) | 2.3 | 1.8 | 1.8 | O | 0.23 | O | O | O | O |

Remarks:
*1 The ratio of addition by weight of polyvinyl butyral resin to coating resin component
*2 Epoxy: EPICOTE #1007 (Trade Mark) Shell Oil Co., Ltd.
*3 Phenol: Ratio of by weight meta-cresol to para-cresol
*4 In the D & I process, the lower the ironing loads are, the more smoothly a coated metal sheet is worked when the loads of the first, second and third ironing steps are 2.5, 2.0 and 2.0 ton/can, respectively, each of the steps can be effected smoothly.
*5 When the stripping load is 0.25 ton/can or less, the stripping can be conducted smoothly.
*6 Condition of coating film of side wall of a can body formed
O: good,
Δ: slightly bad and
x: bad
*7 The amount of addition of olefin type hydrocarbon shown by $CnH_{2n}$ (n = 31 to 38) and containing $CnH_{2n}COOH$ (molecular weight distribution: 1,000 to 5,000) in an amount of 5% by weight is 1.5% by weight.

Next, how to add the olefin type hydrocarbon shown by the chemical formula $CnH_{2n}$ (n=31 to 38) containing $CnH_{2n}COOH$ (molecular weight distribution: 1,000 to 5,000) to the coating resin is described in detail below.

One of the features of this invention is that the olefin type hydrocarbon is added to the coating resin just before the end of the condensation reaction of the coating resin while the temperature of the coating resin bath is kept at a temperature between 85° C. and 110° C. whereby the olefin type hydrocarbon is dissolved uniformly in the coating resin. If the bath temperature is less than 85° C. at the time of the addition of the hydrocarbon, the uniform dispersion thereof is deteriorated so that, when the coating resin is applied to the surface of the metal sheet, it becomes easy to cause the generation of bubles in the coating film or partially uncoated portion of the metal sheet. In addition, when the temperature is more than 110° C., the condensation of the coating resin itself is accelarated whereby the viscosity of the coating resin is elevated and the paintability thereof is decreased. Table 4 shows the relation between the temperature of addition of the olefin type hydrocarbon and the coating integrity of a can body produced by the D & I process. It will be clearly understood from Table 4 that it is preferable to add the olefin type hydrocarbon $[CnH_{2n}(n=31$ to 38)] containing $CnH_{2n}COOH$ (molecular weight distribution: 1,000 to 5,000) to epoxy-phenolic resin just before the condensation reaction of the epoxy-phenolic resin is finished and while the temperature of the coating resin bath is kept at a temperature between 85° C. and 110° C. In these conditions the olefin type hydrocarbon can be mixed uniformly with the coating resin. Furthermore, the mixing conditions have a great influence on the coating integrity of a can body to be formed. That is, in case where the olefin type hydrocarbon is uniformly mixed with the coating resin, the quality of the coating film of the can body formed is kept at a high level but, when the mixture is not uniform, the quality is deteriorated.

In this respect Japanese Laid Open Patent Publication No. 81469/73 discloses that the $CnH_{2n}$ is employed as a main component for a coating material of a steel sheet used for forming a DrD can body.

On the other hand, in this invention the olefin type hydrocarbon contains carboxyl group the structure of $CnH_{2n}COOH$ (molecular weight distribution: 1,000 to 5,000), as set forth above, since the inventors of this invention have found that the carboxyl group acts to further improve the D & I formability of the coated metal sheet and to enhance the adhesion of the coating resin containing the olefin type hydrocarbon to the base metal sheet. The amount of the $CnH_{2n}COOH$ added to the olefin type hydrocarbon is preferably in the range of 1 to 10% by weight.

Table 4

| | Coating film (thickness: 5μm) Epoxy-phenolic resin | | | Bath temp. of epoxy-phenolic resin at the time of addition of olefin type hydrocarbon (°C.) | Ratio of olefin type hydrocarbon by weight to coating resin (%) | Mixing condition O good Δ slightly bad X bad (uneven) | Quality of coating film of can body produced by D & I process |
|---|---|---|---|---|---|---|---|
| Coating number | Epoxy (weight part) | Phenol (weight part) | | | | | |
| 4-1 | 75 | 25 | *2(40/60) | 20 | 0.5% | X | Δ |
| 4-2 | 75 | 25 | (40/60) | 30 | " | X | Δ |
| 4-3 | 75 | 25 | (40/60) | 80 | " | Δ | O |
| 4-4 | 75 | 25 | (40/60) | 85 | " | O | O |
| 4-5 | 75 | 25 | (40/60) | 95 | " | O | O |
| 4-6 | 75 | 25 | (40/60) | 110 | " | O | O |
| 4-7 | 80 | 20 | (50/50) | 20 | 1.5% | X | Δ |
| 4-8 | 80 | 20 | (50/50) | 30 | " | X | Δ |
| 4-9 | 80 | 20 | (50/50) | 80 | " | Δ | O |
| 4-10 | 80 | 20 | (50/50) | 85 | " | O | O |
| 4-11 | 80 | 20 | (50/50) | 95 | " | O | O |
| 4-12 | 80 | 20 | (50/50) | 110 | " | O | O |
| 4-13 | 85 | 15 | (60/40) | 20 | 2.0% | X | Δ |

Table 4-continued
Influence of the bath temperature of the epoxy-phenolic resin at the time of addition of the olefin type hydrocarbon*1

| Coating number | Coating film (thickness: 5μm) Epoxy-phenolic resin | | | Bath temp. of epoxy-phenolic resin at the time of addition of olefin type hydrocarbon (°C.) | Ratio of olefin type hydrocarbon by weight to coating resin (%) | Mixing condition O good Δ slightly bad X bad (uneven) | Quality of coating film of can body produced by D & I process |
|---|---|---|---|---|---|---|---|
| | Epoxy (weight part) | Phenol (weight part) | | | | | |
| 4-14 | 85 | 15 | (60/40) | 30 | " | X | Δ |
| 4-15 | 85 | 15 | (60/40) | 80 | " | Δ | O |
| 4-16 | 85 | 15 | (60/40) | 85 | " | O | O |
| 4-17 | 85 | 15 | (60/40) | 95 | " | O | O |
| 4-18 | 85 | 15 | (60/40) | 110 | " | O | O |
| 4-19 | 85 | 15 | (60/40) | 20 | 5.0% | X | Δ |
| 4-20 | 85 | 15 | (60/40) | 30 | " | X | Δ |
| 4-21 | 85 | 15 | (60/40) | 80 | " | Δ | O |
| 4-22 | 85 | 15 | (60/40) | 85 | " | O | O |
| 4-23 | 85 | 15 | (60/40) | 95 | " | O | O |
| 4-24 | 85 | 15 | (60/40) | 110 | " | O | O |

Remarks:
*1Coating resin contains polyvinyl butyral resin in an amount of 1% by weight.
*2Ratio of meta-cresol to para-cresol.

The curing condition of the coating resin film of this invention is described below.

In general, as a coating film of a metal sheet progresses from partial cure to complete cure, the adhesion of the coating film with a base metal sheet and the hardness of the coating film are enhanced. However, when the coating film is overcured it becomes fragile whereby the adhesion is decreased. In other words, each of coating materials has the condition of cure that its inherent coating properties such as formability, adhesion or scratch hardness is effectively revealed. The state of the coating film meeting the above condition is called "complete cure". The term "complete cure" herein used means the state of the cured coating film in which insoluble part in the coating film cured is between 65% and 90%, inclusive, in accordance with the Methylethylketone Solvent Extraction Method (2 hours, 20° C., dip). More preferably, the insoluble part there of is in the range of 70 to 80%. The Methyl Violet color method is frequently employed to examine the state of cured epoxy-phenolic resin coating film easily.

In the latter method, methyl violet is dissolved in a proper solvent, for example diacetone alcohol, in an amount of 0.1% or so, a coated metal sheet cured is dipped in the solution for a proper time (about 5 seconds), the sheet is washed with water immediately after it is taked out of the solution and the state of the cured coating film is judged on the basis of the degree of the blue color of the coating film. That is, the less the coating film is blue-colored, the more it is cured.

In order to compare the completely cured coating film of this invention with the partially cured coating film of Bethlehem Steel Corporation described later, the Methyl Violet color method is conducted as follows:

Both the coated steel sheet completely cured as per this invention and the coated steel sheet partially cured as per the Bethlehem Steel Corporation method are dipped for 5 seconds in diacetone alcohol solution in which methyl violet is dissolved in an amount of 0.1% and immediately thereafter they are washed with water. It is found that the coating film of the former is slightly blue-colored but the coating film of the latter is deeply blue-colored.

In the aforesaid report "MODERN METALS (1977) Jan. pages 60 to 64" of Bethlehem Steel Corporation, it is disclosed that a steel sheet having a partially cured coating film rather than completely cured coating film thereon should be worked by the D & I process where severe forming conditions are encountered. This results from the thought that in such severe forming conditions, the more fluidic the coating film is, the easier it is to work. However, when the coating film is fluidic, the coating integrity of the outer surface of a can body formed is injured, which causes the build-up or accumulation of the coating material whereby the continuous forming of can bodies tends to become lowered. Besides the partially cured coating is apt to cause such problems as blocking in the coiling step or off-flavor after the contents are packed.

On the other hand, there are no such problems as stated above in case of the completely cured coating. In that case, therefore, the inherent properties of the coating film can be effectively revealed in the D & I process. However, there are not any examples of the completely cured coating film except for Japanese Laid Open Patent Publication No. 37746/78 disclosing that a coating material for a can body containing vinyl acetate copolymer is completely cured on a metal sheet.

The coating of this invention is quite different in components from the prior art and it can sufficiently bear the severe drawing and ironing steps even if the coating film is completely cured. That is, this invention is made possible to obtain a coated metal sheet used for producing a D & I can body having excellen continuous D & I formability coating integrity and corrosion-resistance, the coating film of which has excellent adhesion and lubricity by the combined effects of several conditions such as selection of phenol and epoxy components, ratio of composition, composition of olefin type hydrocarbon, the amount and manner of addition, even when the coating film is completely cured.

The metal sheet herein used is described below.

The metal sheet employed in this invention is a cold-rolled steel sheet, a very thinly chromium-plated steel sheet subjected to a slight surface treatment, a tin-plate, an aluminum-plated cold-rolled steel sheet, a chromium-plated steel sheet, an aluminum sheet and so on. Of course, the metal sheet to be used in this invention is not limited only to the examples stated above.

For example, in case where a can body made of a cold-rolled steel sheet by the D & I process has insufficient corrosion-resistance depending upon the contents to be packed therein, a steel sheet plated with nickel in the thickness of 0.001 μm or a steel sheet plated with chromium in the thickness of 0.001 μm may be employed instead of the cold-rolled steel sheet. In the case, the plating of the cold-rolled steel may be conducted only on its one side surface which is made the inner wall of a can body to be formed.

In addition, a cold-rolled steel sheet plated only on one surface with tin (0.1 to 1.2 μm thickness), aluminum (0.1 to 1 μm thickness) or chromium (about 0.02 μm thickness) may also be employed without plating the other surface. When the plated surface is made the inner wall of a can body the corrosion-resistance of the can body produced can easily be kept high and, therefore, the can body can be put in a practical use by painting only the outer surface thereof. On the other hand, if the plated surface is the outer wall of the can body, it functions to further improve the finished color tone of the outer surface painted. In the above manner it further enhances the effects of this invention to use such plated steel sheets.

Example of this invention are set forth below.

EXAMPLE 1

The mixture of 35 weight parts of meta-cresol and 65 weight parts of para-cresol is condensed with formaldehyde the presence of ammonia catalyst so that methylol phenol resin is produced. 15 weight parts of the methylol phenol resin is condensed with 85 weight parts of bisphenol-A-epoxy resin (EPICOTE #1007), with which polyvinyl butyral resin is mixed in an amount of 3% by weight. The coating resin bath thus prepared is kept at 95° C., to which olefin type hydrocarbon shown by chemical formula $CnH_{2n}$ (n=31 to 38) containing 5% (weight) of $CnH_{2n}COOH$ (molecular weight distribution: 1,000 to 5,000) is added in an amount of 1.5% by weight to the solid component of the epoxy-phenolic resin and is adjusted so that a coating material for a metal sheet used for producing a D & I can body is prepared. An aluminum-killed cold-rolled steel sheet having thickness of 0.34 mm and average surface roughness (Ra) of 0.85 μm is coated with the coating material on its both surfaces in the thickness of 5 μm/side and it is cured at 175° C. for 10 minutes until completely cured by the use of an box-type oven. The insoluble part in the cured coating film is 70% in accordance with the Methylethylketone Solvent Extraction Method. The coated steel sheet thus prepared is worked by the D & I process. The D & I process is directed to the forming of the aforesaid 211×413 Can Size. The result shows that the coated steel sheets are continuously formed into can bodies by the D & I process and that the first, second and third ironing loads and stripping load at that time are 2.3, 1.9, 1.8 and 0.23 ton/can, respectively, which are very excellent values.

In addition, an aqueous solution of a commercially available alkali fat-removing agent (10 g/l 60° C., pH=9) is sprayed on the can body thus formed in an amount of 2 Kg/cm² for 60 seconds, a coolant is removed from the can body and thereafter the can body is washed with a water and is dried. In the fat-removing step, the dissolution or peeling-off of the coating film on the can body is not caused. Next, for the coating integrity test the can body is dipped in an aqueous solution (25° C.) containing 20% $CuSO_4.5$ aq for 30 minutes and the generation of pinholes is examined in the can body. As a result, the generation of pinholes can hardly be detected, which shows an excellent coating integrity of the can body.

On the other hand, a coated steel sheet, the coating resin of which does not contain the olefin type hydrocarbon, can not be formed into a can body by the D & I process. Furthermore, in the case that the olefin type hydrocarbon containing 5% wt of $CnH_{2n}COOH$ (molecular weight distribution: 1,000 to 5,000) is added to the coating resin at the room temperature, i.e. 20° C., the hydrocarbon is not sufficiently despersed uniformly in the coating resin and, therefore, in the coating integrify test of the can body formed by the D & I process a large number of pinholes are found out in the can body, that is the coating integrity is bad.

EXAMPLE 2

The mixture of 60 weight parts of meta-cresol and 40 weight parts of para-cresol is condensed with formaldehyde in the presence of caustic soda catalyst so that methylol phenol resin is produced. 15 weight parts of the methylol phenol resin is condensed with 85 weight parts of bisphenol-A-epoxy resin (EPICOTE #1007), with which polyvinyl butyral resin is mixed in an amount of 3% by weight. The coating resin bath thus prepared is kept at 95° C., to which olefin type hydrocarbon shown by chemical formula $CnH_{2n}$ (n=31 to 38) containing 5% by weight of $CnH_{2n}COOH$ (molecular weight distribution: 1,000 to 5,000) is added in an amount of 1.5% by weight to the solid component of the epoxy-phenolic resin and is adjusted so that a coating material for a metal sheet used to produce a D & I can body is prepared. An aluminum-killed cold-rolled steel sheet having thickness of 0.34 mm and surface roughness (Ra of 0.85 μm and nickel-plated on its both surfaces in the thickness of 0.001 μm is coated with the coating material prepared on its both surfaces in the thickness of 5 μm/side and it is cured at 190° C. for 10 minutes until completely cured.

The insoluble part in the cured coating film is 85% by the Methylethylketone Solvent Extraction Method. The coated steel sheet thus prepared is subjected to the D & I process. The D & I process is directed to the forming of the 211×413 Can Size. The result shows that the coated steel sheets are continuously formed to can bodies by the D & I process and the first, second and third ironing loads and the stripping load, respectively, are 2.3, 1.9, 1.7 and 0.23 ton/can, which are excellent values.

In addition, the fat of the can body formed by the D & I process is removed in the same manner as in Example 1 and the coating integrity test of the can body is conducted. In the fat-removing step the dissolution or peeling off of the coating film is not caused and the generation of pinholes can hardly be detected.

On the other hand, a coated steel sheet, the coating of which does not contain the olefin type hydrocarbon containing 5% (wt) of the $CnH_{2n}COOH$ (molecular weight distribution: 1,000 to 5,000), can not be formed into a can body by the D & I process. Moreover, in case where the olefin type hydrocarbon containing the $CnH_{2n}COOH$ is added to the coating resin bath at room temperature of 20° C. the hydrocarbon is not sufficiently dissolved uniformly in the coating resin and accordingly the coating integrity of the D & I can body is deteriorated.

EXAMPLE 3

The mixture of 50 weight parts of meta-cresol and 50 weight parts of para-cresol is condensed with formaldehyde in the presence of ammonia catalyst so that a methylol phenol resin is produced. 18 weight parts of the methylol phenol resin is condensed with 82 weight parts of bisphenol-A-epoxy resin (EPICOTE #1007), with which polyvinyl butyral resin is mixed in an amount of 1% by weight. The coating resin bath thus prepared is kept at 95° C., to which an olefin type hydrocarbon shown by chemical formula $CnH_{2n}$ (n=31 to 38) containing 5% (wt) of $CnH_{2n}COOH$ (molecular weight distribution: 1,000 to 5,000) is added in an amount of 1.5% by weight to the solid component of the epoxy-phenolic resin and is adjusted, whereby a coating resin material for a metal sheet used for producing a D & I can body is prepared. An aluminum-killed cold-rolled steel sheet having thickness of 0.34 mm and average surface roughness (Ra) of 0.85 μm and chromium-plated on its both surfaces in the thickness of 0.001 μm is coated with the coating resin material on its both surfaces in the thickness of 5 μm/side and it is cured at 180° C. for 10 minutes until completely cured. The insoluble part of the cured coating film is 80% in accordance with the Methylethylketone Solvent Extraction Method. The coated steel sheet thus prepared is formed into a can body by the D & I process. The D & I process is directed to the forming of the 211×413 Can Size. The result shows that the coated steel sheets can continuously be formed to can bodies by the D & I process and the first, second and third ironing loads and stripping load at that time are 2.2, 1.8, 1.7 and 0.22 ton/can, respectively, which are excellent values.

The fat of the can body formed by the D & I process is removed in the same manner as in Example 1 and the coating integrity test of the can body is carried out. In the fat-removing step the dissolution and peel-off of the coating film does not take place and the generation of pinholes can hardly be detected.

On the other hand, a coated steel sheet, a coating material of which does not contain the olefin type hydrocarbon, can not be formed into a can body by the D & I process.

EXAMPLE 4

The mixture of 60 weight parts of meta-cresol and 40 weight parts of para-cresol is condensed with formaldehyde in the presence of ammonia catalyst so that methylol phenol resin is produced. 20 weight parts of the methylol phenol resin is condensed with 80 weight parts of bisphenol -A- epoxy resin (EPICOTE #1007), with which polyvinyl butyral resin is mixed in an amount of 1% by weight. The coating resin bath thus prepared is kept at 95° C., to which olefin type hydrocarbon shown by chemical formula $CnH_{2n}$ (n=31 to 38) containing 5% (wt) of $CnH_{2n}COOH$ (molecular weight distribution: 1,000 to 5,000) is added in an amount of 10% by weight to the solid component of the epoxy-phenolic resin, and is adjusted whereby a coating resin material for a metal sheet used to produce a D & I can body is prepared. An aluminum-killed cold-rolled steel sheet having thickness of 0.34 mm and average surface roughness (Ra) of 0.85 μm is coated with the coating resin material prepared on its both surfaces in the thickness of 5 μm/side and it is cured at 170° C. for 10 minutes until completely cured. The insoluble part in the cured coating film is 70% in accordance with the extraction Method by Methyl-Ethyl-Keton Solvent. The coated steel sheet thus prepared is formed to a can body by the D & I process. The D & I process is directed to the forming of the 211×413 Can Size. The result shows that the coated steel sheets can continuously be formed to can bodies by the D & I process and that the first, second and third ironing loads and stripping load are 2.4, 1.7, 1.7 and 0.23 ton/can, respectively, which is excellent values. The fat of the can body formed by the D & I process is removed in the same manner as in Example 1 and the coating integrity test of the can body is carried out. In the fat-removing step the dissolution and peel-off of the coating film is not caused and the generation of pinholes can hardly be discovered.

On the other hand, a coated steel sheet, the coating material of which does not contain the olefin type hydrocarbon, can not be formed to a can body by the D & I process.

EXAMPLE 5

The coating resin bath prepared in the same manner as in Example 4 is kept at 95° C., to which the olefin type hydrocarbon having the same composition as that in Example 4 is added in an amount of 2.0% by weight to the solid component of the epoxy-phenolic resin and is adjusted so that a coating resin material for a metal sheet used to produce a D & I can body is prepared. An aluminum-killed cold-rolled steel sheet having thickness of 0.34 mm and average surface roughness (Ra) of 0.85 μm is coated with the coating resin material on both surfaces in the thickness of 5 μm/side and it is cured at 200° C. for 10 minutes until completely cured. The coated steel sheet thus prepared is formed to the can body of 211×413 Can Size by the D & I process. The result shows that the coated steel sheets can continuously be formed into can bodies by the D & I process and that the first, second and third ironing loads and stripping load, respectively, are 2.3, 1.7, 1.7 and 0.21 ton/can which are excellent values. The fat of the can body formed by the D & I process is removed in the same manner as in Example 1 and the coating integrity test of the can body is conducted. In the fat-removing step the dissolution or peel-off of the coating film is not caused and the generation of pinholes can hardly be detected in the can body.

On the other hand, a steel sheet coated with a coating resin which does not contain the olefin type hydrocarbon can not be formed into a can body by the D & I process.

EXAMPLE 6

The coating resin bath prepared in the same manner as in Example 4 is kept at 95° C., to which the olefin type hydrocarbon having the same composition as that in Example 4 is added in an amount of 1.5% by weight to the solid component of the epoxyphenolic resin and is adjusted so that a coating material for a metal sheet used to produce a D & I can body is produced. An aluminum-killed cold-rolled steel sheet having thickness of 0.34 mm and average surface roughness (Ra) of 0.85 μm and chromium-plated on its side surface in the thickness of 0.001 μm is coated with the coating material on its both surfaces in the thickness of 5 μm and its cured at 180° C. for 10 minutes until completely cured. The coated steel sheet is such that the chromium-plated surface thereof becomes the inner wall of a can body to be formed and it is formed into a 211×413 Can Size by the D & I process. The result shows that the steel sheets can continuously be formed into can bodies by the D & I process and that the first, second and third ironing loads and stripping load, respectively, are 2.3, 1.9, 1.5 and 0.23 ton/can which are good values.

In addition, the fat of the can body produced by the D & I process is removed in the same manner as in Example 1 and the coating integrity test of the can body is carried out. In the fat-removing step the dissolution and peel-off of the coating film is not caused and the generation of pinholes can hardly be detected in the can body.

On the other hand, the steel sheet having the coating which does not contain the olefin type hydrocarbon thereon can not be formed into a can body by the D & I process.

EXAMPLE 7

A coating material is prepared in the same manner as in Example 6. An aluminum-killed cold-rolled steel sheet having thickness of 0.34 mm and average surface roughness (Ra) of 0.85 μm and nickel-plated on its one side surface in the thickness of 0.001 μm is coated with the coating material on both surfaces in the thickness of 5 μm/side and its cured at 180° C. for 10 minutes until completely cured. The coated steel sheet is formed to 211×413 Can Size by the D & I process so as to make the nickel-plated surface the inner wall of a can body to be formed. The result shows that the steel sheets can continuously be formed into can bodies by the D & I process and that the first, second and third loads and the stripping load are 2.3, 1.8, 1.7 and 0.21 ton/can, respectively, which are excellent values.

In addition, the fat of the can body formed by the D & I process is removed in the same manner as in Example 1 and the coating integrity is tested in the can body. In the fat-removing step the dissolution and peel-off of the coating film does not take place and the pinholes are hardly generated in the can body.

On the other hand, the steel sheet having a coating film which does not contain the olefin type hydrocarbon on can not be formed into a can body by the D & I process.

EXAMPLE 8

A coating material is prepared in the same manner as Example 6. Each of two aluminum-killed cold-rolled steel sheets having thickness of 0.34 mm and average surface roughness (Ra) of 0.85 μm is coated with the coating material on its both surfaces in the thickness of 5 μm/side. One of the steel sheets are cured at 180° C. for 10 minutes until completely cured while the other steel sheet is cured at 150° C. for 6 minutes until partially cured. The insoluble part of the coating film of the latter is 0% in accordance with the Methylethylketone Solvent Extraction Method. These coated steel sheets are formed into 211×413 Can Size by the D & I process. The result of the former shows that the continuous D & I process can be carried out and that the first, second and third ironing loads and stripping load, respectively, 2.3, 1.8, 1.7 and 0.22 ton/can which are good values.

On the other hand, in the latter case the continuous D & I process can not be conducted since a large amount of build-up occurs at the ironing dies when five coated steel sheets are worked. The fats of the former can body and of the latter can body (before the D & I process is made impossible) are removed in the same manner as in Example 1, and the coating integrity is tested in each of the can bodies. In the fat-removing step the dissolution and peel-off of the coating films are not caused in both the can bodies. The generation of pinholes can hardly be caused in the former can body but in the latter can body a large number of pinholes are generated over the inner and outer surfaces.

EXAMPLE 9

A coating material is prepared in the same manner as in Example 6. An aluminum-killed cold-rolled steel sheet having thickness of 0.34 mm and average surface roughness (Ra) of 0.85 μm is coated with the coating material on one side surface in the thickness of 5 μm and it is cured at 180° C. for 10 minutes until completely cured. The coated steel sheet is formed into 211×413 Can Size so as to make non-coated surface the inner wall of a can body by the D & I process. The result shows that the continuous D & I process can be carried out and that the first, second and third ironing loads and the stripping load are 2.3, 1.8, 1.8 and 0.22 ton/can, respectively, which are excellent values.

In addition, the fat of the can body formed is removed in the same manner as in Example 1 and the coating integrity is tested in the can body. In the fat-removing step the dissolution and peel-off of the coating film are not caused and the pinholes are hardly generated in the can body.

On the other hand, a steel sheet having a coating film which does not contain the olefin type hydrocarbon on it can not be formed to a can body by the D & I process.

EXAMPLE 10

A coating material is prepared in the same manner as in Example 6. An aluminum-killed cold-rolled steel sheet having thickness of 0.34 mm and average surface roughness (Ra) of 0.85 μm and tin-plated on its one side surface in the thickness of 5 μm is coated with the coating material on its non-plated surface and it is cured at 180° C. for 10 minutes until completely cured. The coated steel sheet thus prepared is formed to 211×413 Can Size by the D & I process such that the tin-plated surface is made the inner wall of the can body. The result shows that the continuous D & I process can be effected and that the first, second and third ironing loads and stripping load are 2.2, 1.7, 1.7 and 0.20 ton/can, respectively, which are good values.

Furthermore, the fat of the can body produced is removed in the same manner as in Example 1 and the coating integrity is tested in the can body. The coating film shows an excellent adhesion.

On the other hand, a steel sheet having a coating film which does not contain the olefin type hydrocarbon on it can not be formed into a can body by the D & I process.

EXAMPLE 11

The coating material used is the same as that used in Example 6. An aluminum-killed cold-rolled steel sheet having thickness of 0.34 mm and average surface roughness (Ra) of 0.85 μm and aluminum-plated on its side surface in the thickness of 0.8 μm is coated with the coating material on its non-plated surface in the thickness of 5 μm and it is cured at 180° C. for 10 minutes until completely cured. The coated steel sheet is formed to 211×413 Can Size by the D & I process such that the aluminum-plated surface is made the inner wall of the can body, the result shows that the continuous D & I process of the steel sheets can be conducted and that the first, second and third ironing loads and stripping load are 2.2, 1.7, 1.7 and 0.20 ton/can, respectively, which are good values.

Moreover, the fat of the can body formed is removed in the same manner as in Example 1 and the coating integrity is examined in the can body. The coating film of the can body shows an excellent adhesion.

On the other hand, the steel sheet having a coating film which does not contain the olefin type hydrocarbon on it can not be formed into a can body by the D & I process.

EXAMPLE 12

The coating material used is the same as that used in Example 6. An aluminum-killed cold-rolled steel sheet having thickness of 0.34 mm and average surface roughness (Ra) of 0.85 μm and chromium-plated on its one side surface in the thickness of 0.02 μm is coated with the coating material on its non-plated surface on the thickness of 5 μm and it is cured at 180° C. for 10 minutes. The coated steel sheet thus prepared is formed into 211×413 Can Size by the D & I process such that the chromium-plated surface is made the inner wall of the can body. The result shows that the continuous D & I process can be carried out and that the first, second and third ironing loads and stripping load are 2.2, 1.7, 1.7 and 0.20 ton/can, respectively, which are excellent values.

In addition, the fat of the can body formed is removed in the same manner as in Example 1 and the coating integrity are examined in the can body. The coating film shows a good adhesion.

On the other hand, a steel sheet having a coating film which does not contain the olefin type hydrocarbon thereon can not be formed into a can body by the D & I process.

We claim:

1. A coated metal sheet adapted for use as a drawn and ironed can body which comprises a metal sheet and a coating composition film completely cured on both of its surfaces or on one surface to be made the outer surface of a can body to be formed with dried film thickness of 2 to 10 μm, said coating composition comprising epoxy-phenolic resin containing (1) an acetal-type resin and (2) an olefin-type hydrocarbon having the chemical formula $CnH_{2n}$ (n=31 to 38) admixed with $CnH_{2n}COOH$ having a molecular weight distribution of 1,000 to 5,000 which is added to the epoxy-phenolic resin in an amount of 0.5 to 2.0% by weight, said epoxy-phenolic resin being prepared by condensing thermosetting type phenol resin with bisphenol-A-epoxy resin having mean molecular weight of 450 to 3700 at the weight ratio of 25:75 to 10:90, said thermosetting-type phenol resin being prepared by condensing the mixture of meta-cresol and para-cresol at the weight ratio of 30:70 to 60:40 with formaldehyde in the presence of alkali catalyst.

2. The coated metal sheet according to claim 1 in which the olefin type hydrocarbon is added to the epoxy-phenolic resin at a temperature between 85° C. and 110° C.

3. The coated metal sheet according to claim 1 in which the epoxy-phenolic resin contains the acetal type resin in an amount of 1 to 3% by weight.

4. The coated metal sheet according to claim 1 in which the olefin type hydrocarbon contains the $CnH_{2n}COOH$ in an amount of 1 to 10% by weight.

5. The coated metal sheet according to claim 1 in which the alkali catalyst is selected from the group consisting of ammonia catalyst and sodium hydroxide.

6. The coated metal sheet according to claim 1 in which the metal sheet is selected from the group consisting of a cold rolled steel sheet, a chromium-plated steel sheet, a tin-plate, a nickel-plated steel sheet, an aluminum-plated steel sheet, a cold-rolled steel sheet subjected to slight surface treatment and an aluminum sheet.

7. The coated metal sheet according to claim 1 in which the insoluble part in the coating composition film completely cured is in the range of 65% to 90%.

8. The coated metal sheet according to claim 6 in which the insoluble part is in the range of 70% to 80%.

9. The coated metal sheet according to claim 1 in which the acetal resin is polyvinyl butyral resin.

* * * * *